United States Patent
Hogan et al.

(10) Patent No.: US 12,028,010 B2
(45) Date of Patent: Jul. 2, 2024

(54) COMPENSATION TECHNIQUE FOR PARALLEL MOTOR DRIVES

(71) Applicant: Hamilton Sundstrand Corporation, Charlotte, NC (US)

(72) Inventors: Diarmaid John Hogan, Ballinlough (GB); Andrei Dinu, Leicester (GB); Rodrigo Fernandez-Mattos, Solihull (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 190 days.

(21) Appl. No.: 17/840,827

(22) Filed: Jun. 15, 2022

(65) Prior Publication Data

US 2023/0027564 A1  Jan. 26, 2023

(30) Foreign Application Priority Data

Jun. 16, 2021 (EP) .................................. 21275083

(51) Int. Cl.
  *H02P 5/46* (2006.01)
  *H02K 11/33* (2016.01)
  *H02P 27/08* (2006.01)

(52) U.S. Cl.
  CPC ............ *H02P 5/46* (2013.01); *H02K 11/33* (2016.01); *H02P 27/08* (2013.01)

(58) Field of Classification Search
  CPC .......... H02P 27/00; H02P 27/04; H02P 27/06; H02P 27/08; H02P 27/085; H02P 21/00;
  (Continued)

(56) References Cited

U.S. PATENT DOCUMENTS 5,206,802 A  4/1993 Blasko
5,253,155 A  10/1993 Yamamoto
(Continued)

FOREIGN PATENT DOCUMENTS

| CN | 110474553 A | 11/2019 |
| EP | 2408099 A2 | 1/2012 |
| JP | 6733015 B2 | 6/2015 |

OTHER PUBLICATIONS

Abstract for CN110474553 (A), Published on Nov. 19, 2019, 1 page.
Abstract for JP5733015 (B2), Published on Jun. 10, 2015, 1 page.
European Search Report for Application No. 21275083.0, dated Nov. 25, 2021 7 pages.

* cited by examiner

*Primary Examiner* — Antony M Paul
(74) *Attorney, Agent, or Firm* — CANTOR COLBURN LLP

(57) ABSTRACT

A system for controlling one or more loads. The system comprises a plurality of power converters, wherein each power converter is configured to be arranged in a parallel configuration with one or more additional power converters so as to control the one or more loads, and a central controller configured to output a common reference based on local current or voltage values received from each power converter; and transmit the common reference to each of the power converters. Each power converter comprises an inverter configured to control the one or more loads based on voltage switching signals, a module configured to provide the voltage switching signals to the inverter according to a modulation scheme.

15 Claims, 10 Drawing Sheets

(58) Field of Classification Search
CPC ...... H02P 21/0003; H02P 21/02; H02P 21/04; H02P 21/14; H02P 21/18; H02P 21/22; H02P 21/34; H02P 23/00; H02P 23/07; H02P 23/14; H02P 25/00; H02P 25/022; H02P 25/062; H02P 25/064; H02P 25/092; H02P 25/107; H02P 2101/30; H02P 2205/07; H02P 2205/05; H02P 2207/01; H02M 1/38; H02M 1/385; H02M 1/007; H02M 1/009; H02M 3/33569; H02M 3/33584; H02M 7/487; H02M 1/42; H02M 5/4585; H02M 7/483; H02M 1/0032; H02M 7/5395; H02M 1/0006; H02M 3/33546; B60L 2210/30; B60L 2210/40; B60L 2220/14; B60L 7/06; B60L 7/14

See application file for complete search history.

(56) References Cited

U.S. PATENT DOCUMENTS

| | | |
|---|---|---|
| 5,852,554 A | 12/1998 | Yamamoto |
| 7,145,266 B2 | 12/2006 | Lynch et al. |
| 8,710,782 B2 | 4/2014 | Tallam et al. |
| 9,236,804 B2 | 1/2016 | Pal et al. |
| 9,257,934 B2 | 2/2016 | Hamada et al. |
| 2012/0075892 A1 | 3/2012 | Tallam et al. |
| 2012/0235614 A1* | 9/2012 | Tallam ............ H02M 5/4585 318/400.27 |
| 2020/0280258 A1 | 9/2020 | Yamazaki et al. |

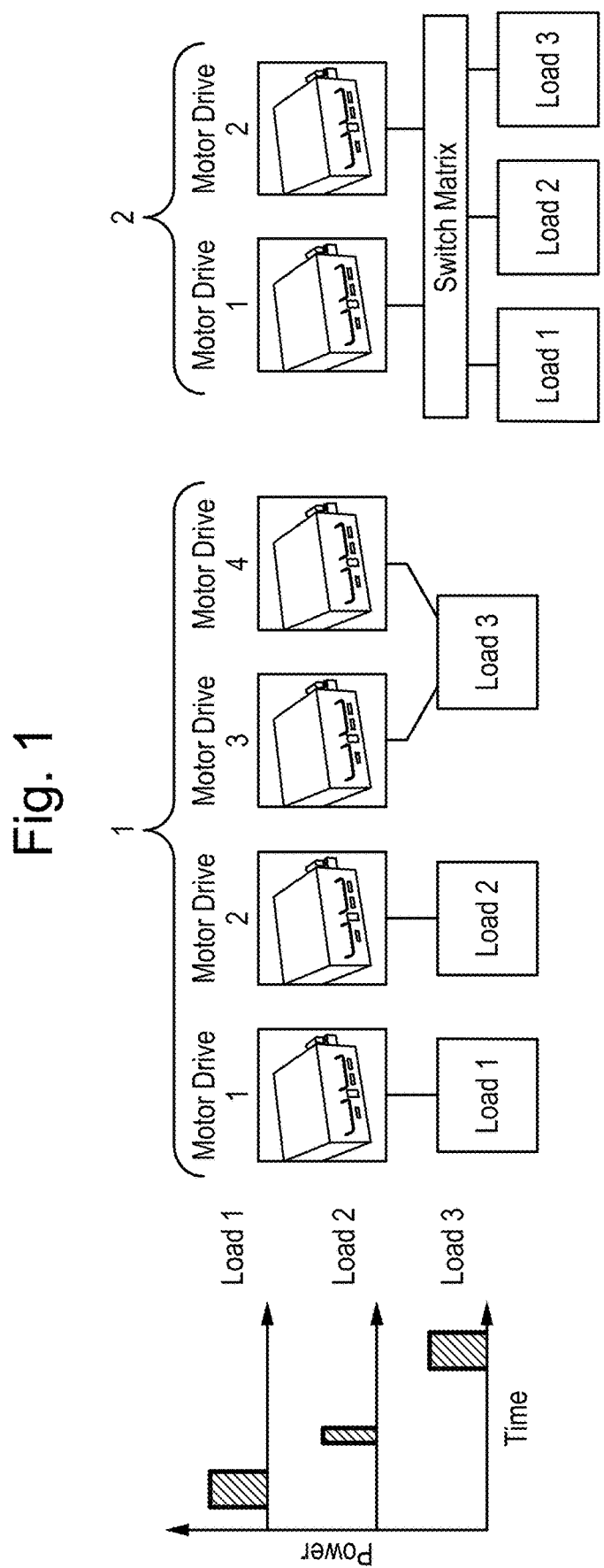

COMPENSATION TECHNIQUE FOR PARALLEL MOTOR DRIVES

CROSS REFERENCE TO RELATED APPLICATIONS

This application claims priority to European Patent Application No. 21275083.0 filed Jun. 16, 2021, the entire contents of which is incorporated herein by reference.

FIELD

The present disclosure relates generally to a distributed system (or electronic control architecture) for controlling one or more loads.

BACKGROUND

Electronic control architectures are provided with power converters (e.g., motor drives) that form an electrical circuit which accepts an input (e.g., AC or DC) and generates an output (e.g., AC or DC) of a different voltage. The development of such power converters is a significant part of the development of a new control architecture, program or system. It is envisioned that standardised power converters could significantly reduce development costs, by providing the ability for one or more loads to be controlled using multiple power converters.

To facilitate wide power requirement ranges of the one or more loads, it may be necessary to use a plurality of power converters operating in parallel. Mutualised or multiplexed power converter architectures become more relevant as the number of electronic components increases. This is the case, for example, in the aircraft industry as more electronically controlled components are used.

In such systems, a plurality of power converters may be interfaced to electrical loads through a switch that can reconfigure the connection between electrical loads and power converters. In the case of an aircraft, certain loads may not be used simultaneously during a flight or at the same point in time, such as a landing gear actuator and thrust reverser actuator. As such, these components can in theory be powered by the same power converter, with the switch reconfiguring the connection accordingly.

FIG. 1 illustrates example of power converters (in this case motor drive) systems and how they might be connected to loads. The graph on the left-hand side illustrates the power requirements of the loads 1, 2 and 3, showing that at any point in time the loads do not simultaneously require power.

The first example 1 includes four motor drives connected to three loads, wherein motor drives 1 and 2 are connected in a simple manner to a respective load each. Motor drives 3 and 4 are connected in a slightly more complex manner, such that their outputs are combined and used to drive a single load.

The second example 2 includes just two motor drives connected in a multiplexed manner to the same three loads of the first example 1. Due to the use of a switch the two motor drives are able to power the three loads to the same extent as the four motor drives of the first example 1.

The benefit of a combined or multiplexed approach is the potential reduction of weight and increase of drive availability compared to conventional architectures.

To take the maximum advantage of the combined or multiplexing concept (in particular the latter), paralleling control architectures for motor drives is a critical technology, which enables large loads to be powered by the parallel connection of multiple drives. This avoids having to dimension one motor drive for maximum load power, for example.

Solutions for providing parallel motor drives should be aimed at reducing weight, for example of the various components used within the architecture. It has also been found that the use of scalable and modular solutions may be important in enabling motor drive inverters to operate in standalone or a parallel configuration to a variable number of motor drives (e.g., two or more drives in parallel). The aim of the present invention, as discussed in more detail below, is to achieve this without significant need for reconfiguration of the control architecture.

System level control architectures have been proposed to facilitate the operation of multiple motor drives operating in parallel to regulate the total load current, speed or position, depending on the application. Two such architectures and their operation are the subject of co-pending patent applications, and are illustrated in FIGS. 2A and 2B.

FIG. 2A shows a system 100 comprising a plurality of motor drives 120 that may each include an inverter 122 and output inductors 124. The motor drives 120 may each receive DC power via input terminals 50. This may then be converted by the inverter 122 into an output voltage (e.g., a three-phase AC voltage) for actuating a load via inductors 124.

The plurality of motor drives 120 are provided with a common or centralised operation (e.g., control system) to synchronise their operation. Accordingly, the motor drives 120 may be controlled centrally using a central controller 150, which is configured to control the motor drive(s) 120 to be used at a particular time. The central controller 150 achieves this by switching between the motor drives using a modulation scheme or technique.

The FIG. 2A arrangement combines the use of local current controllers (e.g., current control loops) and the central controller 150, wherein the local current controllers are configured to receive current values associated with each output voltage phase of the inverter 122 (e.g., measured at an output of each inverter 122 and optionally presented in a synchronous reference frame or "d-q system"), and then calculate a local voltage reference Vlocal for each of the motor drives 120 to be transmitted to the central controller 150.

The central controller 150 is configured to determine or calculate a global voltage reference Vglobal based on the local output voltage references Vlocal from each of the paralleled motor drives 120. The global voltage reference Vglobal may be an average or sum of the local voltage references Vlocal. The global voltage reference Vglobal is then transmitted back to each local motor drive 120, to be used as part of the modulation (e.g., to generate suitable modulation duty cycles). For example, the modulation elements may generate a suitable switching pattern for the inverters 122 based on the global voltage reference Vglobal.

A balancing network 180 may be used within each motor drive 120 that can form a supplementary element of the local control scheme. The balancing network 180 may be configured to adjust the global voltage reference Vglobal based on the local output currents of the respective inverter 122. This can help to alleviate differences in output currents between the motor drives 120.

Any suitable method or type of modulation may be employed. In particular, the modulation may comprise pulse width modulation ("PWM") such as space vector modulation ("SVM"). Each motor drive 120 may include a modulation module 126 configured to control the synchronisation of the motor drive 120, for example the synchronisation of a switching frequency of the modulation, e.g., using PWM or SVM.

The central controller 150 is configured to receive the plurality of local voltage references Vlocal from each of the motor drives 120, calculate the global voltage reference Vglobal based on (e.g., a sum of) the local voltage references Vlocal, and then transmit the global voltage reference Vglobal to each of the motor drives 120. The modulation of the output voltage of each inverter 122 uses a modulation scheme or technique as discussed above, which is applied using the modulation module 126. That is, the modulation module 126 receives as an input the global voltage reference Vglobal and is configured to regulate the output current(s) of each inverter 122 based on the global voltage reference Vglobal.

More specifically, each motor drive 120 includes components (e.g., processor or circuitry) that form one or more control loops (or controllers), including in the illustrated embodiment a speed loop 160 and a current loop 170. The central controller 150 is configured to output a reference that is used in these loops to control the duty cycle of the switching signals.

For example, a reference speed ωref may be given to all power converters (e.g., motor drives 120) operating in parallel, and may be set by the central controller 150 or elsewhere (e.g., a flight control computer, or other component or module). For example, a flight controller may be commanding that a component moves by actuating to a certain position at a given speed. Where a speed loop 160 is included, this would be configured to generate a suitable reference current, which is then input into the current loop 170 to regulate the output current of the motor drive (described below), in effect regulating the speed of rotation of the motor.

A speed loop 160 is not essential, however, for example in cases where the load is not a motor, or the rotational speed of the motor does not otherwise require regulation. In such a case the central controller 150 could output a reference current for inputting directly into the current control loop 170.

The system 100 may pick up an actual machine speed ω from the output of the motor, as shown in FIG. 2A.

Each (local) current control loop 170 is configured to calculate its respective local voltage reference Vlocal for the motor drive 120 as discussed above. The current loop 170 is configured to regulate the output current of the respective motor drive 120, so as to ensure the motor drives 120 operating in parallel work together adequately and effectively. That is, to generate the correct currents, the output voltage of the motor drive 120 needs to be set correctly. The current loop 170 (and speed loop 160 if provided) are used to calculate the local voltage reference Vlocal, which is then used to generate the correct switching sequence of the motor drives 120 (e.g., via the modulation technique or scheme) to facilitate this.

Accordingly, using a local current control loop (rather than this being centralised) leads to a more scalable and less complex system than previous solutions.

The distributed system 100 uses synchronous reference frame control, which is known in the art (also called "d-q control"). Using such a control mechanism, the voltage and current can be converted into a reference frame that rotates synchronously with a voltage vector (e.g., by Park Transformation) so that three-phase time-varying signals are transformed into DC signals. Using "d-q currents" provides a convenient way of representing the output current of the motor drive, and analysing the system.

FIG. 2B shows a similar system, but where the central controller 150 is configured to output a global current reference based on the local current measurement values at the inverters 122, and transmit the global current reference to each of the motor drives 120. The modulation of the output voltage of each inverter 122 uses a modulation scheme or technique as discussed above. The modulation module 126 still receives a local voltage reference as an input, but the local voltage reference is based on (e.g., scaled with) the global current reference (rather than using a global voltage reference as with FIG. 2A). Accordingly, the system is configured to regulate the output current(s) of the inverters 122 based on the global current reference.

Control architectures such as those shown and described in respect of FIGS. 2A and 2B rely on inner control loops (e.g., speed and/or current control loops 160, 170) to calculate appropriate switching duty cycles for the inverters 122, so as to regulate their local output current and, under correct operation, deliver the correct machine current with limited current recirculation or distortion.

Switching "deadtime" for a power converter is a practical consideration, which relates to the requirement that under no conditions should there be simultaneous conduction of different switches in an inverter during a single phase leg. This would result in a short circuit of the input supply and damage the system. An overview of how this switching action takes place and the impact it has on the resulting output current is discussed below. This corresponds to a conventional method of applying deadtime compensation.

FIG. 3 illustrates the circuit diagram for a single phase leg of a two level, three phase inverter 122. As is known in the art, a two level, three phase voltage inverter is configured to generate six non-zero voltage vectors and two zero voltage vectors, which can be applied to the machine terminals of the inverter (to power the motor).

The switching signal Ai and its inverse $\overline{Ai}$ are fed into suitable logic control 122A, which provides a corresponding gate drive command signal A and its inverse $\overline{A}$. The gate drive circuit 122B then produces the appropriate voltage signals to conduct the different switches 122C in the inverter at the correct time.

FIG. 4 illustrates the signals over time, with the switching signals Ai and its inverse $\overline{Ai}$ corresponding to the intended duty cycle of the inverter, as well as the gate drive command A, $\overline{A}$ and voltage signals VaN. The bottom two graphs correspond to the inverter operating in a high side mode (i) and low side mode (ii). As illustrated in FIG. 4, the logic control 122A applies a "deadtime" tb when converting the switching signals Ai, $\overline{Ai}$ to the gate drive command signals A, $\overline{A}$s (which is then also applied to the voltage signals VaN). This deadtime is applied, as noted above, in order to avoid the voltage signals VaN overlapping in time and a resulting short circuit of the input supply.

Although solving this problem, application of the deadtime error typically induces an error in the phase voltage at the zero crossing point of the phase current. This is illustrated in FIG. 5, showing a plot of phase voltage and current (versus time) as a result of applying deadtime compensation. The induced error in the actual voltage (i.e., when the current crosses the zero point) leads to a distortion in the phase current at this point (zero crossing). This can induce undesired harmonics into the system and some further compensation to avoid this has been proposed.

If an inverter is operating in a standalone mode (i.e., not in a parallel arrangement), then an improvement in the phase current around the zero crossing point can be achieved through a modification of the inverter duty cycle based on the deadtime and phase current polarity. A diagram of one deadtime compensation scheme is illustrated in FIG. 6 for a single phase, but is equivalent across the three phases for the three phase two-level inverter considered above. This compensation scheme generates a compensation term (dacomp, dbcomp,dccomp) to be added to or subtracted from the duty cycle of each respective phase. The polarity of the phase current (e.g., Iameas) will cause the term to either add to or subtract from the duty cycle in question. The term is further calculated based on the modulation switching frequency fsw scaled by the deadtime tdt, delayed by one sample step (z-1), then added to or subtracted from the duty cycle for the respective phase. The other compensation terms dbcomp and dccomp, corresponding to the other phase currents Ibmeas and Icmeas, will be calculated in the same manner.

This conventional deadtime compensation scheme is reliant on a local current measurement of the local inverter phase currents (Iameas, Ibmeas, Icmeas, etc.) to generate the correct deadtime compensation term (dacomp, dbcomp, dccomp) to modify the duty cycle for each phase as set out above. This is shown to be problematic when operating inverters in parallel, as there will be differences in the phase current for each of the parallel inverter phases due to current imbalances resulting from recirculating currents. This means that there will be slight differences in the polarity of inverter phase currents close to the zero crossing point, causing the scheme to work ineffectively.

FIG. 7 illustrates the current sharing errors that result from this, which include undesired deviations (e.g., some of which are indicated as spikes S) from the ideal curves.

SUMMARY

One technical effect of the present disclosure is to provide a compensation mechanism that achieves the same effects as described above while avoiding inducing errors so as to provide a more effective system.

In accordance with an aspect of the disclosure, there is provided a system for controlling one or more loads. The system comprises: a plurality of power converters, wherein each power converter is configured to be arranged in a parallel configuration with one or more additional power converters so as to control the one or more loads; and a central controller configured to output a common reference based on local current or voltage values received from each power converter; and transmit the common reference to each of the power converters. Each power converter comprises: an inverter configured to control the one or more loads based on voltage switching signals; a module configured to provide the voltage switching signals to the inverter according to a modulation scheme, wherein the inverter is configured to apply a deadtime to the voltage switching signals in order to avoid the voltage switching signals overlapping in time; one or more control loops configured to calculate appropriate duty cycles for the voltage switching signals; and circuitry configured to modify the duty cycles based on the common reference shared between the motor drives, so as to compensate for voltage errors produced by applying the deadtime.

This system accounts for differences between the power converters and reduces errors accordingly. In particular, there will be differences in the output phase currents for each of the parallel power converters due to current imbalances resulting from, e.g., recirculating currents. This means that there will be slight differences in the polarity of inverter phase currents (especially close to the zero crossing points thereof), causing conventional schemes to work ineffectively. The above system deals with this and other errors by modifying the duty cycles based on the common reference shared between the power converters, which avoids using the locally measured values (that typically have slight differences) and reduces or eliminates errors introduced as a result, for example at the zero crossing points.

The common references is shared between the power converters and is used in the same manner locally at each power converter to modify the duty cycles as aforesaid.

The control loops may be configured to calculate the appropriate duty cycles for the voltage switching signals so as to regulate the inverter output current(s).

The system may be for controlling the mechanical speed, angle or position of the one or more loads. The present disclosure uses the term "control" since the system is able to control various aspects of one or more loads using power converters operating in parallel. The main example provided is the use of power converters to control the speed of a motor, but there are various other applications as would be appreciated by a person of skill in the art. These include using a similar system to control the angle or position of a load (e.g., of one or more flight control surfaces)

The common reference may correspond to a target reference value for the inverters of each motor drive, wherein the inverters are configured to track the same target reference value. This means the same common reference can be used to both modify the duty cycles, and ensure the inverters track the same target reference. The target reference value may be a common reference speed, in which case it could be converted to a common reference current within each local power converter. Alternatively the target reference value could be taken directly as a common reference current.

In either case the common reference current could be used by the circuitry configured to modify the duty cycles to compensate for voltage errors produced by applying the deadtime as aforesaid. The circuitry may modify the duty cycle in any suitable way to achieve this result. For example, the circuitry could be configured to output a reference current value for each phase of the inverter, and then use a polarity of each reference current value to either add or subtract a compensation term to the duty cycle of each respective phase to provide the modification as aforesaid.

The common reference current can be provided as a synchronous reference frame current.

Each inverter may be configured to receive the switching signals and convert these to output voltage signals for controlling the one or more loads. The inverter may apply the deadtime during the conversion of the switching signals to the output voltage signals, and in order to avoid the output voltage signals overlapping in time as aforesaid.

A magnitude of the output voltage signals may be set using a global voltage or current reference provided to each of the power converters and set by the central controller, wherein the global voltage or current reference is different to the common reference.

Each inverter may be configured to receive an input voltage corresponding to the voltage switching signals, and convert this to an output voltage corresponding to the output voltage signals, wherein the output voltage has an associated output current, wherein the modulation module may be configured to regulate the output current of the inverter based on the global voltage or current reference provided to each of the power converters and set by the central controller.

The input voltage may be a DC input voltage and the output voltage may be a three-phase output voltage.

Each modulation module may be configured to generate the appropriate voltage switching signals for the respective inverter of each power converter to provide a controlled commutation of the output voltages thereof, and send the voltage switching signals to the inverter so as to control the timings of the output voltages in use.

Each power converter may be a single power converter and/or the circuitry/components thereof may be located on a single circuit board.

The circuitry of each power converter may be configured to convert current values associated with the voltages output from the inverter thereof to a synchronous reference frame current.

Unless otherwise indicated, the various method steps, functional elements, stages, "modules" and "means" of the disclosure (e.g., the system and structure described above) may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

The various method steps, functional elements, stages, "modules" and "means" of any aspects or embodiments of the present disclosure (e.g., the system and structure described above) may be implemented at least partially using software, e.g., computer programs.

It will thus be seen that when viewed from further aspects the present disclosure provides computer software specifically adapted to carry out the method steps, functional elements, stages, "modules" and "means", etc., herein described (e.g., the system and structure described above) when installed on data processing means, a computer program element comprising computer software code portions for performing the methods herein described when the program element is run on data processing means, and a computer program comprising code means adapted to perform all the steps of a method or of the methods herein described when the program is run on a data processing system.

The software or computer system adapted to carry out the method steps, functional elements, stages, "modules" and "means" of any aspects or embodiments of the present disclosure (e.g., the system and structure described above) may be implemented on a single device.

BRIEF DESCRIPTION OF THE DRAWINGS

Various embodiments will now be described, by way of example only, and with reference to the accompanying drawings in which:

FIG. 1 illustrates some examples of power converter (in this case motor drive) systems and how they might be connected to loads;

DETAILED DESCRIPTION

Figure 2A:
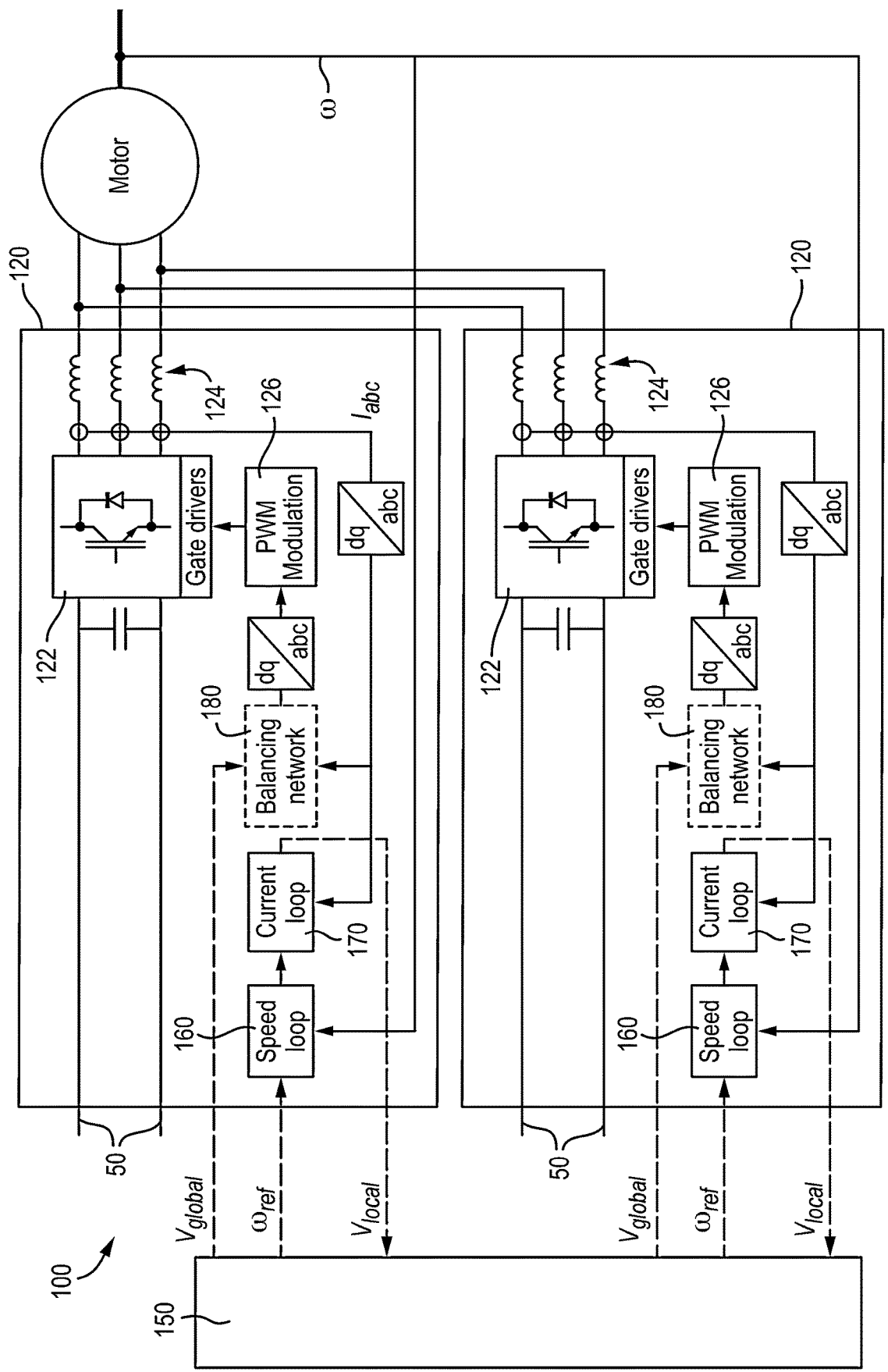
FIG. 2A shows a system comprising a plurality of power converters (in this case motor drives) that uses a global voltage reference to regulate the output currents of the inverters thereof.

Herewith will be described various embodiments of a distributed system (or electronic control architecture") for controlling one or more loads. The system comprises a plurality of power converters (e.g., motor drives). The power converters may be used to power (e.g., control or actuate) one or more loads. The power converters may be arranged in a parallel configuration and could be configured to control or actuate a single load, or a plurality of loads. In the latter case the output of the power converters could be connected to the loads via a switch that is configured to electrically connect each load with a selected one or more (e.g., a subset) of the plurality of power converters. The power converters could be located on an aircraft and may be configured to power (e.g., control or actuate) one or more aircraft components such as a thrust reverser or landing gear actuator. The components may not require power at the same time or concurrently.

An architecture for controlling/actuating one or more loads is disclosed in accordance with various embodiments, wherein the architecture comprises a plurality of power converters (e.g., motor drives) that are operatively connected to one or more loads. The power converters may be configured to control (e.g., power, actuate or otherwise move) the one or more loads. The loads may be or comprise an actuator and/or motor, although the disclosure is not limited as such and the loads could be any suitable load that can be powered by a plurality of power converters. The various components of the architecture, including the power converters (e.g., motor drives), loads and actuators, may be electronically controlled.

The power converters may be connected in a parallel configuration, such that a plurality of power converters may be used to actuate the same load. In this manner, a plurality of power converters may be provided that are used to actuate a single load, or a plurality of power converters may be provided that are configured to actuate multiple loads. In the latter case, a switch may be configured to select the power converter(s) from the plurality of power converters and operatively connect the selected power converters to each respective load. The switch may be configured so that only one load is being driven by the plurality of power converters (e.g., a selected one or a subset thereof) at a particular time. The plurality of power converters may be powered by the same power supply and each may include a power inverter.

The distributed system 100 according to the present disclosure may be a system as shown and described above in respect of FIG. 2A or 2B.

That is, the system 100 comprises a plurality of motor drives 120 that each include an inverter 122 and output inductors 124. It will be appreciated that references to motor drives in accordance with various embodiments could refer to any type of power converter, and the broadest aspects of the present disclosure are not intended to be limited to using motor drives, or providing a load in the form of a motor. The motor drives 120 are controlled centrally using a central controller 150 (e.g., processor or circuitry) as described above.

Figure 3:
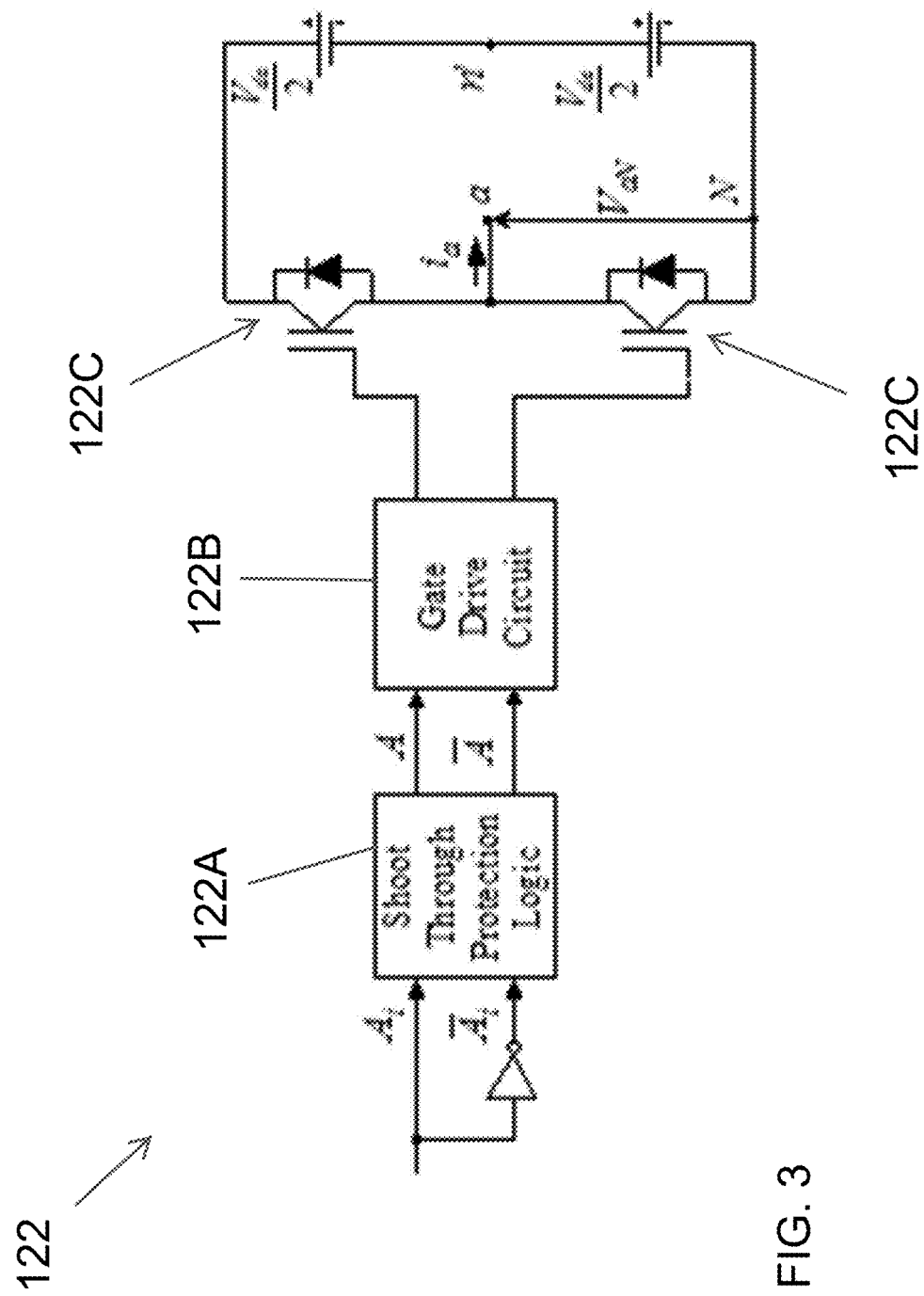
FIG. 3 illustrates a circuit diagram for a single phase leg of a two level, three phase inverter that may be used in the present disclosure.
Figure 4:
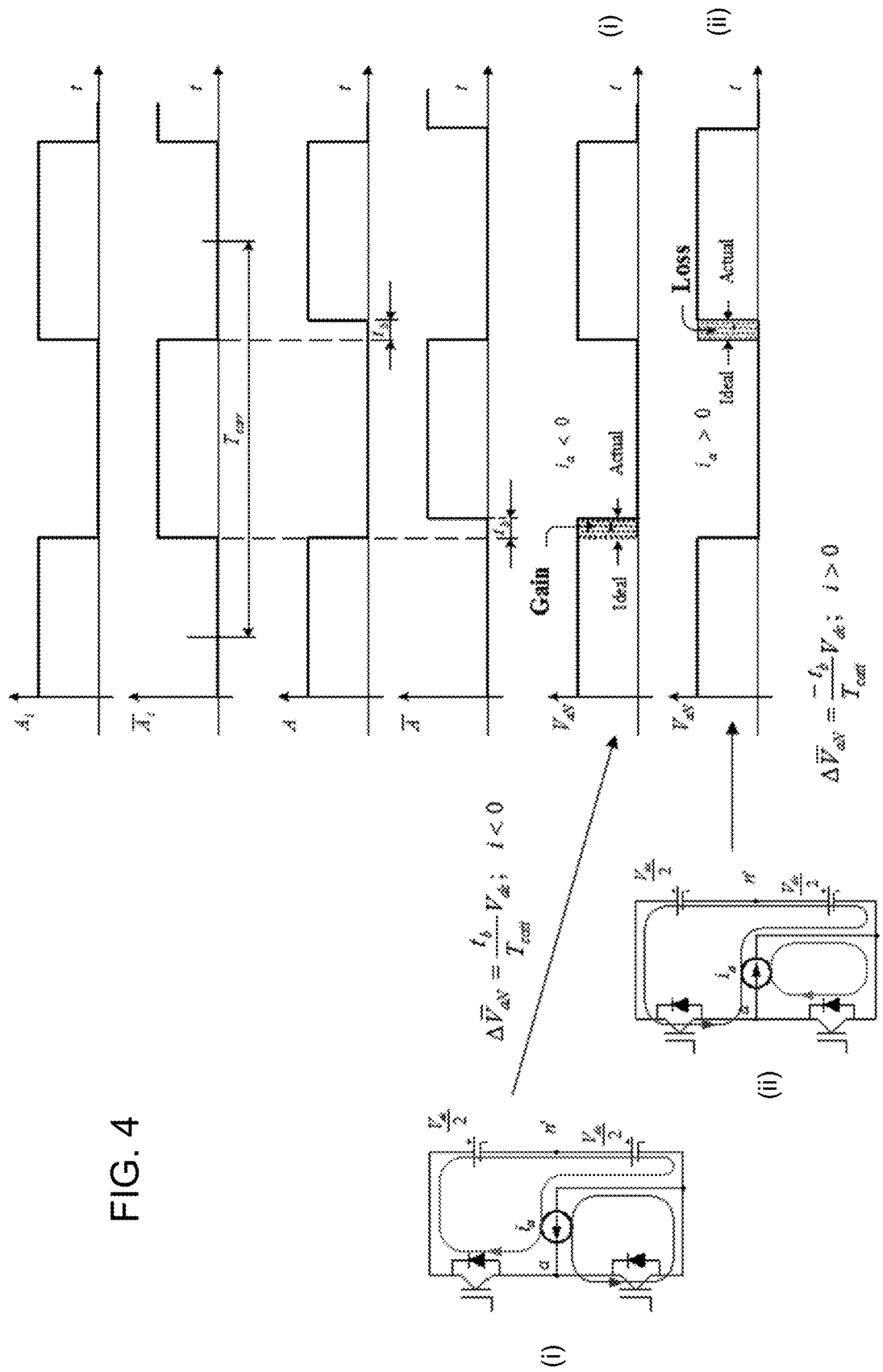
FIG. 4 illustrates voltage switching signals for an inverter such as that of FIG. 3, with the voltage switching signals corresponding to the intended duty cycle of the inverter.
Figure 5:
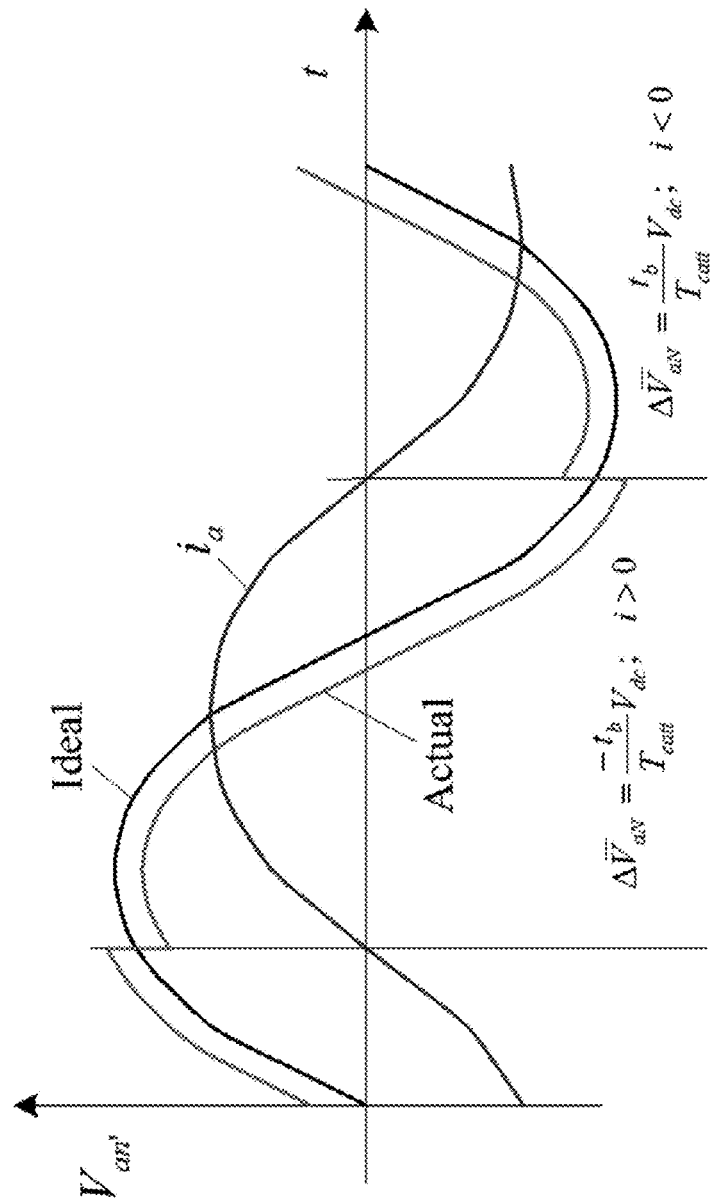
FIG. 5 shows a plot of phase voltage and current (versus time) as a result of applying deadtime compensation.

The present disclosure relates specifically to the inverters 122 and a control scheme used in connection with each inverter 122 that is configured to compensate for the deadtime applied to the switching signals therein. That is, each inverter 122 operates substantially as shown and described in respect of FIGS. 3 to 5 discussed above, with a deadtime applied to the gate drive command signals VaV. However, in contrast to above the compensation scheme is modified so that it is different to that shown and described with respect to FIG. 6, as will be explained in more detail below.

Figure 6:
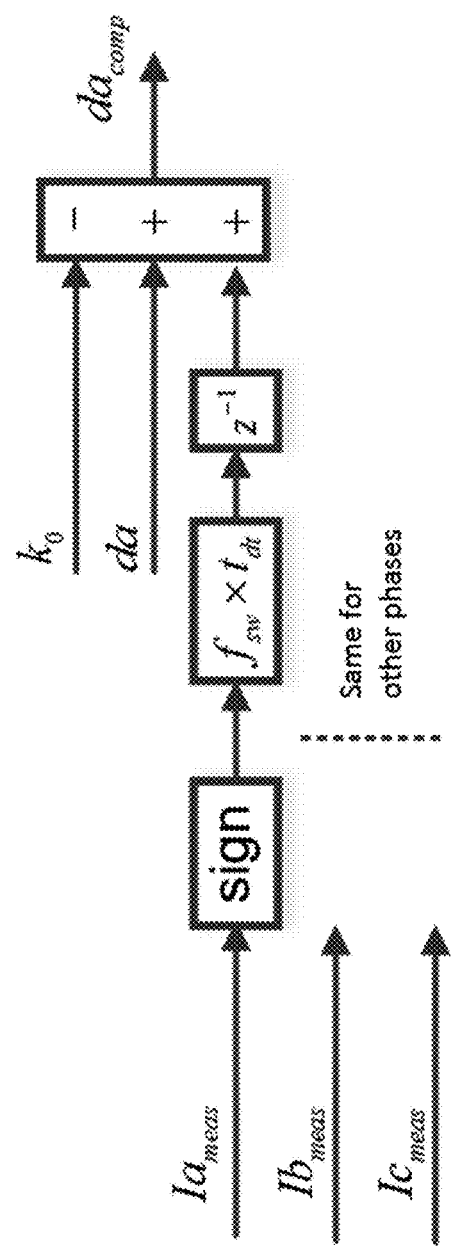
FIG. 6 illustrates a deadtime compensation technique that uses measured output currents of an inverter to produce a compensation term.
Figure 7:
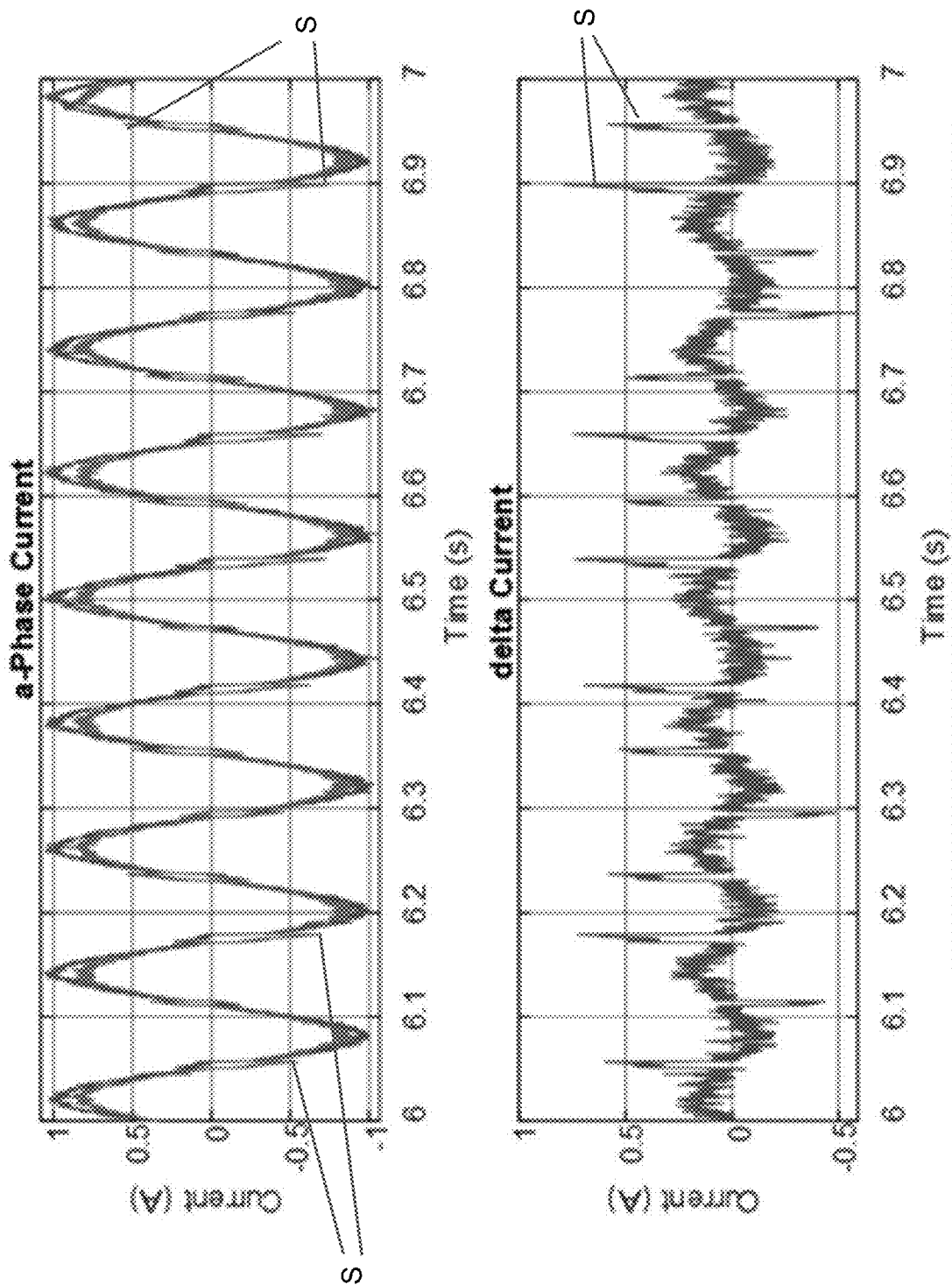
FIG. 7 shows graphs that illustrate current sharing errors that result from the use of the conventional technique of FIG. 6.

In the conventional FIG. 6 scheme, the measured inverter phase currents (Iameas, Ibmeas, Icmeas) are used to produce a respective deadtime compensation term for each phase (dacomp, dbcomp,dccomp). This may be suitable for a standalone inverter, but it has been recognised that applying this to inverters in parallel leads to various problems (as discussed above). To overcome these, the present disclosure uses a reference signal from the central controller 150 in the deadtime compensation scheme. This will be discussed in more detail below.

Figure 8:
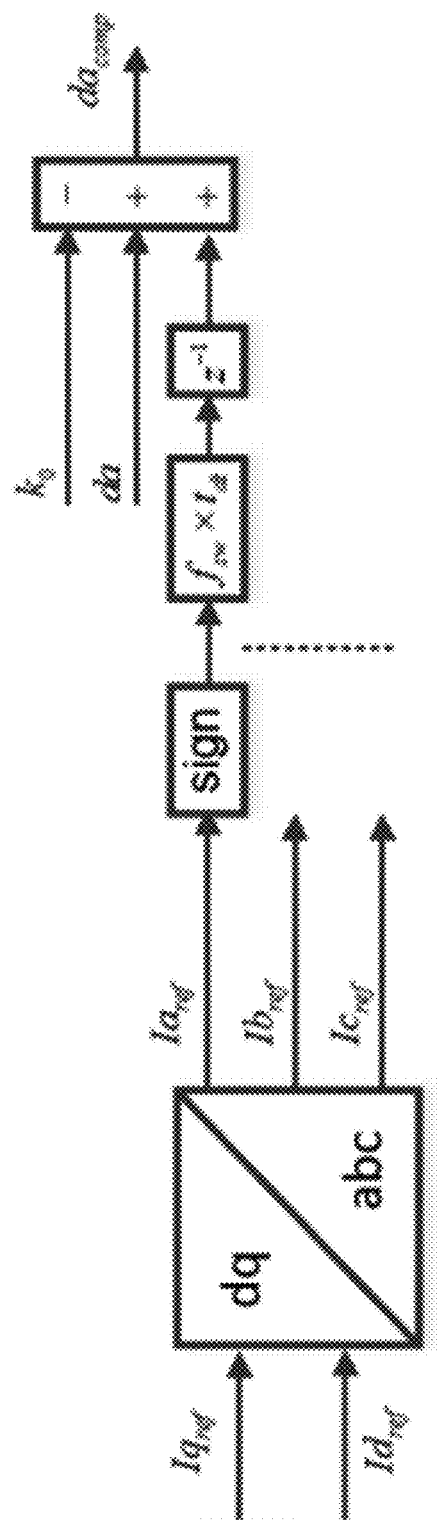
FIG. 8 shows a deadtime compensation scheme that includes a common reference (shared between the motor drives) instead of measured output currents local (and unique) to each motor drive.

FIG. 8 shows a compensation scheme that includes a common reference current in the form of d-q reference currents Iqref and Idref that are output by (or derived from) the central controller 150. These should be converted to a three phase current Iaref, Ibref, Icref in order to determine when the current crosses the zero-point.

Figure 2B:
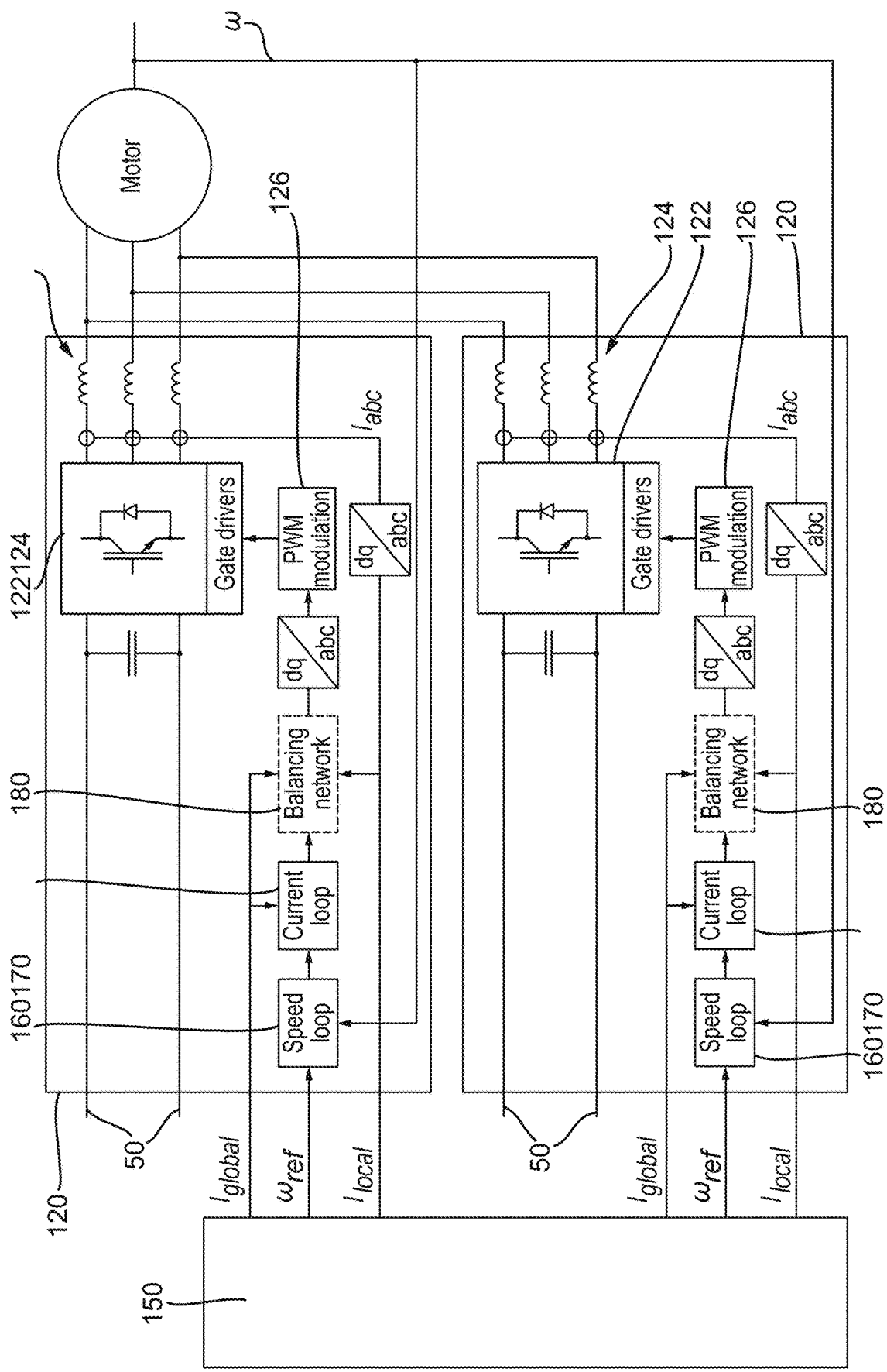
FIG. 2B shows a similar system that uses a global current reference in place of the global voltage reference of FIG. 2A.

The central controller 150 may output a global voltage reference Vglobal or a global current reference Iglobal (see above and FIGS. 2A and 2B). These global voltage/current references Vglobal, Iglobal can be seen as global feedback signals and are part of the control scheme that ensures the effective parallel operation of the system 100.

In addition to the above global references, the central controller 150 additionally shares a reference signal that is common to the motor drives 120, which is used to ensure they all track the same target value. The present disclosure uses this reference signal to also compensate for the deadtime applied to the switching signals in the inverters 122.

In the illustrated embodiment the common reference signal is the reference speed ωref that is input into the speed loop 160. As discussed above the speed loop 160 is configured to receive the common reference speed ωref from the central controller 150 and output a reference current for the inner current loop 170. As also noted above, instead of a reference speed the central controller 150 could output a reference current directly to the current loop 170, in which case the reference signal would be this common reference current.

The common reference current (either derived from the reference speed or shared directly) may be provided as d-q reference currents and then converted to 'a-b-c' reference currents (Iaref, Ibref, Icref) as shown in FIG. 8. Referring to the three-phase reference currents Iaref, Ibref, Icref, each of these values are used in the same manner as described above as part of a compensation scheme for the applied deadline; that is, the polarity of the phase current (Iaref, Ibref, Icref) is used to either add or subtract a compensation term for each phase (dacomp, dbcomp,dccomp). Each compensation term is further based on the modulation switching frequency fsw scaled by the deadtime tdt, delayed by one sample step (z-1), and is then added to or subtracted from the original duty cycle for the respective phase.

The modification of the duty cycles may be carried out on each local motor drive 120, for example using a local controller (e.g., processor or circuitry) in conjunction with one or more control loops (e.g., the speed and/or current control loops 160, 170). The inverters 122 may have hardware or software that apply the deadtime for the switching signals generated from and provided by the modulation module 126, which deadtime ensures that no operating conditions can result in dangerous switching of the inverters 122 as discussed above. To compensate for this, the duty cycles (used to generate the inverter switching signals) generated via the control loop(s) are modified via the disclosed deadtime compensation scheme to improve the response of the system when applying the deadtime.

More generally, the deadtime compensation term (dacomp, dbcomp,dccomp) is calculated based on a common, estimated output phase current using the common reference signal, and the duty cycle for each phase is modified using this term to compensate for the voltage error produced by the applied deadtime. Since the estimated output phase current is based on a common reference shared between the motor drives 120 (instead of, e.g., a locally measured value), generation of the compensation term is less affected by current recirculation between the motor drives operating in parallel. In other words, using the common, estimated reference current from the central controller 150 (rather than local, measured current values Iameas, Ibmeas, Icmeas) the compensation scheme is able to achieve a desired improvement in system performance to account for the errors introduced at the zero crossing point of the phase current.

This provides more effective parallel operation of the inverters 122, since the present disclosure uses reference signals for each inverter 122 that are equivalent, rather than varying locally between each inverter 122 as with the conventional methods.

The reference current may be provided in the form of d-q reference currents Iqref and Idref, wherein a Park transformation may be used to transition the reference frame from synchronous to stationary. This may require each inverter 122 to use the same speed reference ω of the motor, as shown in the illustrated example, although other methods are envisaged. The machine speed may be measured from each motor via an encoder, resolver or other suitable sensor. This measurement may be shared locally to each motor drive 120 and used in the Park Transformation. The reference current used in the present disclosure is therefore seen as an ideal, estimated reference current for each phase. The reference current is then used to generate the local deadtime compensation reference for each inverter 122 operating in parallel, as described above.

Figure 9:
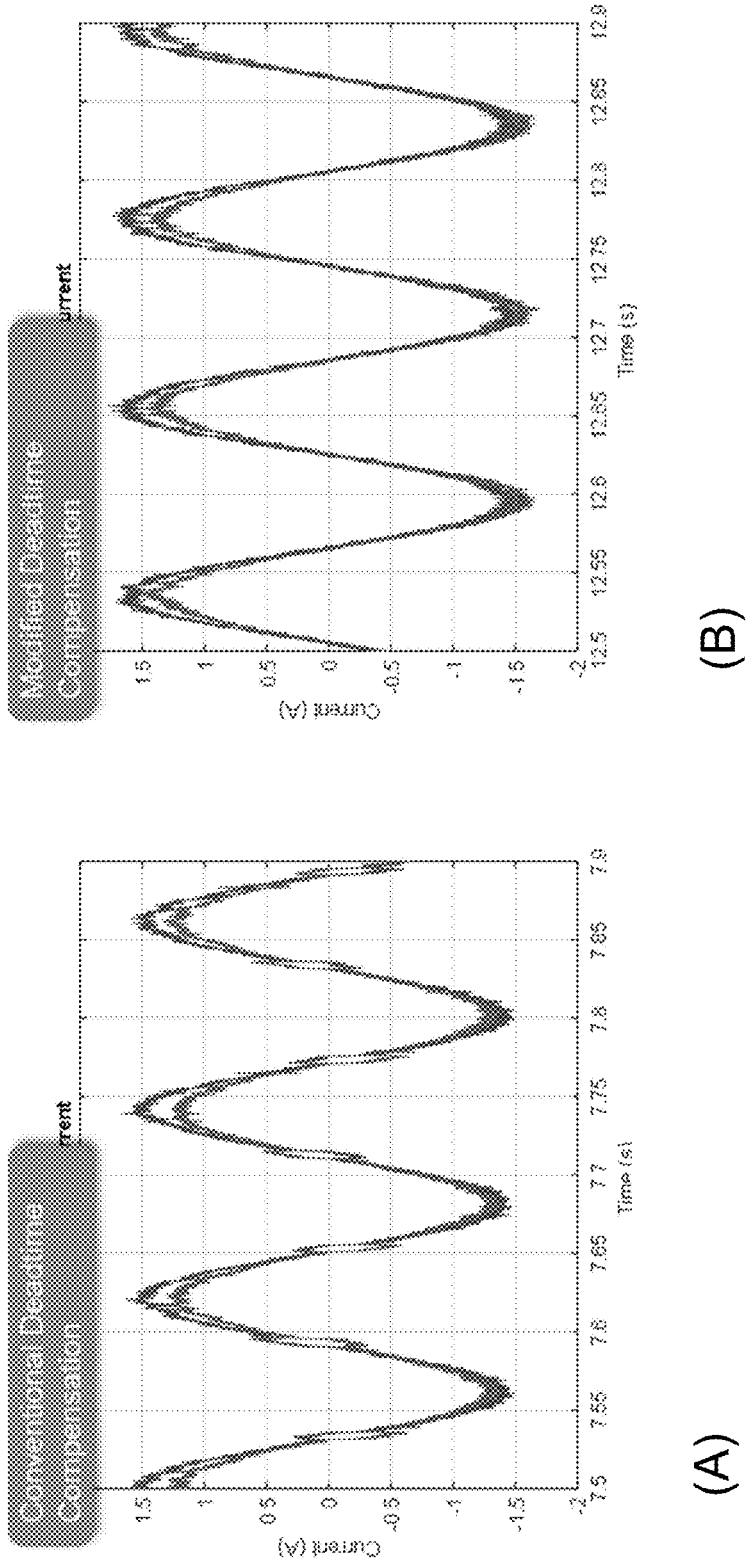
FIG. 9 shows a first graph (A) that corresponds to a conventional deadtime compensation technique as shown in FIG. 6, and then a second graph (B) that corresponds to a deadtime compensation technique as shown in FIG. 8 and according to the present disclosure.

Experimental testing has validated the operation of this modified deadtime compensation scheme, as seen in FIG. 9. This shows a first graph (A) that corresponds to conventional deadtime compensation, and next to this a second graph (B) that corresponds to a deadtime compensation scheme according to the present disclosure. As is evident, the current is more steady and there are fewer (if any) spikes that lead to the issues described above.

The present disclosure therefore provides an important solution to facilitate parallel and reconfigurable operation of inverters operating in parallel, where the performance improvement in load current sharing is significantly improved. The use of deadtime compensation allows for improvement in harmonic content of the output phase current. For example, the presented solution mitigates the problems of phase current being misaligned at the zero-crossing point, and without requiring significant modification to the duty cycle generation control scheme.

Although the present disclosure has been described with reference to various embodiments, it will be understood by those skilled in the art that various changes in form and detail may be made without departing from the scope of the invention as set forth in the accompanying claims.

The invention claimed is:

1. A system for controlling one or more loads, comprising:
a plurality of power converters, wherein each power converter is configured to be arranged in a parallel configuration with one or more additional power converters so as to control the one or more loads; and
a central controller configured to output a common reference based on local current or voltage values received from each power converter, and transmit the common reference to each of the power converters;
wherein each power converter comprises:
an inverter configured to control the one or more loads based on voltage switching signals;
a module configured to provide the voltage switching signals to the inverter according to a modulation scheme, wherein the inverter is configured to apply a deadtime to the voltage switching signals in order to avoid the voltage switching signals overlapping in time;
one or more control loops configured to calculate appropriate duty cycles for the voltage switching signals; and
circuitry configured to modify the duty cycles based on the common reference shared between the motor drives, so as to compensate for voltage errors produced by applying the deadtime.

2. The system as claimed in claim 1, wherein the system is for controlling the mechanical speed, angle or position of the one or more loads.

3. The system as claimed in claim 1, wherein the common reference corresponds to a target reference value for the inverters of each motor drive, wherein the inverters are configured to track the same target reference value.

4. The system as claimed in claim 3, wherein the target reference value is a common reference speed or common reference current.

5. The system as claimed in claim 4, wherein the common reference current is provided as a synchronous reference frame current.

6. The system as claimed in claim 1, wherein either the target reference value is a common reference speed that is converted to a common reference current, or the target reference value is a common reference current,
wherein the common reference current, either converted from the common reference speed or taken directly as the target reference value, is used by the circuitry configured to modify the duty cycles to compensate for voltage errors produced by applying the deadtime as aforesaid.

7. The system as claimed in claim 6, wherein the circuitry configured to modify the duty cycles is configured to output a reference current value (Iaref, Ibref, Icref) for each phase of the inverter, and then use a polarity of each reference current value to either add or subtract a compensation term to the duty cycle of each respective phase to provide the modification as aforesaid.

8. The system as claimed in claim 1, wherein each inverter is configured to receive the switching signals and convert these to output voltage signals for controlling the one or more loads, wherein the inverter applies the deadtime during the conversion of the switching signals to the output voltage signals, and in order to avoid the output voltage signals overlapping in time as aforesaid.

9. The system as claimed in claim 8, wherein a magnitude of the output voltage signals is set using a global voltage or current reference provided to each of the power converters and set by the central controller.

10. The system as claimed in claim 9, wherein each inverter is configured to receive an input voltage corresponding to the voltage switching signals, and convert this to an output voltage corresponding to the output voltage signals, wherein the output voltage has an associated output current, wherein the modulation module is configured to regulate the output current of the inverter based on the global voltage or current reference provided to each of the power converters and set by the central controller.

11. The system as claimed in claim 10, wherein the input voltage is a DC input voltage and the output voltage is a three-phase output voltage.

12. The system as claimed in claim 1, wherein each modulation module is configured to:
generate the appropriate voltage switching signals for the respective inverter of each power converter to provide a controlled commutation of the output voltages thereof; and
send the voltage switching signals to the inverter so as to control the timings of the output voltages in use.

13. The system as claimed in claim 1, wherein each power converter is a single power converter and the circuitry/components thereof are located on a single circuit board.

14. The system as claimed in claim 1, wherein the circuitry of each power converter is configured to convert current values of the voltages output from the inverter to a synchronous reference frame current.

15. The system as claimed in claim 1, wherein the one or more loads comprises a motor, and the power converters are motor drives configured to control the speed of the motor.

* * * * *